United States Patent
Chen et al.

(10) Patent No.: US 11,452,286 B2
(45) Date of Patent: Sep. 27, 2022

(54) METHOD OF PREDICTING CENTRAL FISHING GROUND OF FLYING SQUID FAMILY OMMASTREPHIDAE

(71) Applicant: SHANGHAI OCEAN UNIVERSITY, Shanghai (CN)

(72) Inventors: Xin Jun Chen, Shanghai (CN); Jin Tao Wang, Shanghai (CN); Lin Lei, Shanghai (CN)

(73) Assignee: SHANGHAI OCEAN UNIVERSITY, Shanghai (CN)

( * ) Notice: Subject to any disclaimer, the term of this patent is extended or adjusted under 35 U.S.C. 154(b) by 920 days.

(21) Appl. No.: 16/319,810

(22) PCT Filed: May 25, 2017

(86) PCT No.: PCT/CN2017/086000
§ 371 (c)(1),
(2) Date: Jan. 22, 2019

(87) PCT Pub. No.: WO2018/014658
PCT Pub. Date: Jan. 25, 2018

(65) Prior Publication Data
US 2019/0230913 A1    Aug. 1, 2019

(30) Foreign Application Priority Data

| Jul. 22, 2016 | (CN) | 201610580774.5 |
| Jul. 22, 2016 | (CN) | 201610580962.8 |
| Jul. 22, 2016 | (CN) | 201610580969.X |

(51) Int. Cl.
*A01K 99/00* (2006.01)
*G06N 3/08* (2006.01)
(Continued)

(52) U.S. Cl.
CPC .............. *A01K 99/00* (2013.01); *G06F 17/18* (2013.01); *G06N 3/08* (2013.01); *G06N 3/084* (2013.01);
(Continued)

(58) Field of Classification Search
CPC ...... A01K 99/00; A01K 227/40; G06N 20/00; G06N 3/08; G06N 3/084; G06N 5/046; G06F 17/18; G06Q 50/02
(Continued)

(56) References Cited

U.S. PATENT DOCUMENTS 9,298,978 B1 * 3/2016 Hlatky .................. G06Q 50/02
2021/0368747 A1 * 12/2021 Chrobak ................. G06T 7/62

FOREIGN PATENT DOCUMENTS

| CN | 102833680 A | 12/2012 |
| CN | 103235982 A | 8/2013 |

(Continued)

OTHER PUBLICATIONS

Wang, Jintao et al., Analysis of the Optimum Temporal and Spatial Scale as well as Environmental Factors of the Fishery Forecasting Models for Illex argentinus, Journal of Fishery Sciences of China, Sep. 30, 2015, pp. 1007-1014, vol. 22, No. 5.
(Continued)

*Primary Examiner* — Aditya S Bhat
(74) *Attorney, Agent, or Firm* — Bayramoglu Law Offices LLC

(57) ABSTRACT

A method of predicting a central fishing ground of flying squid family Ommastrephidae, includes three steps of setting spatial and temporal dimension, setting environmental factor, and establishing a central fishing ground prediction model. The spatial and temporal dimension includes three levels of spatial dimensions, and two levels of temporal dimensions of week and month. An SST is selected as a main
(Continued)

Input layer    Hidden layer    Output layer environmental factor, and two environmental factors, i.e., SSH and Chl-a, are selected as a supplement. The environmental factors include four situations. According to the setting situations of the spatial and temporal dimension and the environmental factor, a set of sample schemes of 24 situations is established using permutation and combination method. An error backward propagation neural network model is established, wherein an input layer inputs data of the sample scheme set, and an output layer outputs a CPUE or a fishing ground grading index converted from the CPUE.

8 Claims, 8 Drawing Sheets

(51) Int. Cl.
*G06N 20/00* (2019.01)
*G06F 17/18* (2006.01)
*G06N 5/04* (2006.01)
*G06Q 50/02* (2012.01)

(52) U.S. Cl.
CPC .............. *G06N 5/046* (2013.01); *G06N 20/00* (2019.01); *G06Q 50/02* (2013.01); *A01K 2227/40* (2013.01)

(58) Field of Classification Search
USPC .......................................................... 706/21
See application file for complete search history.

(56) References Cited

FOREIGN PATENT DOCUMENTS

| | | |
|---|---|---|
| CN | 106157162 A | 11/2016 |
| CN | 106204314 A | 12/2016 |
| CN | 106250980 A | 12/2016 |

OTHER PUBLICATIONS

Wang, Jintao et al., Impacts of Oceanic Environmental Factors of Different Temporal and Spatial Scales on Fishery Forecasting Models for Illex argentinus in the Southwest Atlantic, Proceedings of the 2014 Academic Annual Conference on China Geographical Information Science, Oct. 12, 2014, pp. 203-210.

Wang, Jintao, Fishery Forecasting and Stock Assessment for Commercial Oceanic Ommastrephid Squid, Chinese Doctoral Dissertations full-text Database (Agriculture Science and Technology), 2016, No. 3.

* cited by examiner

Input layer   Hidden layer   Output layer

METHOD OF PREDICTING CENTRAL FISHING GROUND OF FLYING SQUID FAMILY OMMASTREPHIDAE

CROSS REFERENCE TO THE RELATED APPLICATIONS

This application is the national phase entry of International Application No. PCT/CN2017/086000, filed on May 25, 2017, which is based upon and claims priority to Chinese Patent Application No. 201610580774.5, filed on Jul. 22, 2016, Chinese Patent Application No. 201610580969.X, filed on Jul. 22, 2016, and Chinese Patent Application No. 201610580962.8, filed on Jul. 22, 2016, the entire contents of which are incorporated herein by reference.

TECHNICAL FIELD

The present invention relates to a method of predicting fishing ground, and particularly to a method of predicting central fishing ground of flying squid family Omniastrephidae.

BACKGROUND

The central fishing ground forecast is a kind of quick report of fishing conditions. Accurate central fishing ground forecast can improve catch yields and reduce fuel costs for fishing production. The quick report of fishing conditions is to predict the location of the central fishing ground, the movement of the school of fish and the possibility of flourishing in the next 24 hours or a few days. The forecast content is quickly and accurately transmitted to the production vessels by the fishing information command unit via the telecommunications system, regularly every day, thus achieving the purpose of commanding the on-site production.

Currently, a variety of methods for forecasting the central fishing grounds of oceanic economic flying squid family Ommastrephidae are available. These methods are based on the relationships and regularities between the behavior and biological conditions of fish and the environmental conditions, and essence thereof is to acquire "experiential knowledge" from samples of production statistics for the forecasting. However, previous studies on the spatial and temporal dimensions of samples and the selections of environmental factors have not been carried out in depth. Basically, the central fishing ground forecast is achieved by settings based on experience (such as large fishing areas and small fishing areas), without considering the influence of different spatial and temporal dimensions and environmental factors on the central fishing ground prediction model. In the selection of models, the timeliness issue of marine environmental factors is rarely considered.

SUMMARY

The technical problem to be solved by the present invention is to provide a method of predicting a central fishing ground of flying squid family Ommastrephidae, combining the spatial and temporal dimensions of the samples of the oceanic economic flying squid family Ommastrephidae and the selections of environmental factors, and considering their influence on the central fishing ground, to establish a prediction model.

Technical Solution

A method of predicting a central fishing ground of flying squid family Ommastrephidae, includes three steps of setting spatial and temporal dimensions, setting environmental factors, and establishing a central fishing ground prediction model;

the spatial and temporal dimensions include three levels of spatial dimensions and two levels of temporal dimensions, specifically, the three levels of spatial dimensions are latitude and longitude of 0.25°×0.25°, 0.5°×0.5°, and 1.0°×1.0°, respectively, and the two levels of temporal dimensions are week and month;

a sea surface temperature (SST) is selected as a main environmental factor, and two environmental factors, i.e., sea surface height (SSH) and chlorophyll a (Chl-a), are selected as a supplement;

when establishing the central fishing ground prediction model, the environmental factors include four situations: I. SST; II. SST, SSH; m. SST, Chl-a; and IV. SST, SSH, Chl-a; according to the setting situations of the spatial and temporal dimensions and the environmental factor, a set of sample schemes of 24 situations is established using permutation and combination method; the central fishing ground prediction model uses a classic error backward propagation (BP) neural network model, the BP neural network model has a three-layer structure, including an input layer, a hidden layer and an output layer, the input layer inputs the spatial and temporal factors and the environmental factors of the fishing ground; and the output layer outputs a CPUE (catch per unit effort) or a fishing ground grading index converted from the CPUE; when the BP neural network model is subjected to a forward propagation, the sample enters from the input layer, and after processed by the activation function of the hidden layer, the result is propagated to the output layer; if the error between the actual output of the output layer and the desired output of the output layer does not meet the error requirements, the backward propagation stage of the error starts, backward propagation is to propagate the error back layer by layer to the input layer through the hidden layer, and distribute the error to all nodes in each layer, thereby obtaining the error signals of all nodes in each layer, the error signals are used as the basis for correction, the forward propagation of the signal and the backward propagation of the error are carried out in cycles, and the weight is constantly adjusted, this process is continued until the error of the network output is reduced to an acceptable level or until a preset number of learning times is reached, and the optimal model is obtained through learning and training for use in forecasting.

The number of nodes in the hidden layer is determined by a formula $P_{num}=2N_{num}+1$, the $P_{num}$ is the number of nodes in the hidden layer, and the $N_{num}$ is the number of nodes in the input layer.

Further, after the establishment of the BP neural network model, the accuracies and stabilities of the BP neural network models obtained from the set of sample schemes of different situations are compared to obtain the model with the highest accuracy and stability under this environment, which is used as the central fishing ground prediction model in this environment.

Further, the comparison of the accuracies of the BP neural network models is carried out as follows. When the outputs of the models are CPUE levels, the accuracies of the models obtained from the set of sample schemes of different situations are compared according to the correct level percentages predicted by the models. When the outputs of the models are CPUE values, the mean square error of the models is calculated, and the accuracies of the models obtained from the set of sample schemes of different situations are compared.

Further, the stabilities of the BP neural network models obtained from the set of sample schemes of different situations are compared by calculating the average relative variance (ARV). The average relative variance is defined as follows:

$$ARV = \frac{\sum_{i=1}^{N}[x(i)-\hat{x}(i)]^2}{\sum_{i=1}^{N}[x(i)-\bar{x}(i)]^2};$$

wherein, N is the number of comparison data, x(i) is the actual value of the fishing ground level, $\bar{x}(i)$ is the actual average value of the fishing ground level, and $\hat{x}(i)$ is the predicted value of the fishing ground level.

After the comparison, for the prediction of the central fishing ground of the flying squid (Ommastrephidae) in the northwest Pacific Ocean, the BP neural network model of a sample scheme with a temporal dimension of week, a spatial dimension of 1.0°×1.0°, and an environmental factor of SST is used as the fishing ground prediction model.

For the prediction of the central fishing ground of the Humboldt squid (*Dosidicus gigas*) in the southeast Pacific Ocean, the BP neural network model of a sample scheme with a temporal dimension of month, a spatial dimension of 0.5°×0.5°, and environmental factors of SST and SSH is used as the fishing ground prediction model.

For the prediction of the central fishing ground of the Argentine shortfin squid (*Illex argentinus*), the BP neural network model of a sample scheme with a temporal dimension of week, a spatial dimension of 1.0°×1.0°, and an environmental factor of SST is used as the fishing ground prediction model.

Beneficial Effect

In the present invention, considering the influence of different spatial and temporal dimensions and the selections of environmental factors on the central fishing ground prediction model, a set of sample schemes of different situations are established according to the setting situations of the spatial and temporal dimension and the environmental factors. Moreover, a classic error backward propagation (BP) neural network and a supervised algorithm of error backward propagation are used to learn and store a large number of mapping modes for the forecasting in main operating time, in an optimal operating sea area range, and in the SST range, the SSH range and the Chl-a range suitable for the flying squid family Ommastrephidae to inhabit, which provides technical support for improving catch yields and reducing fuel costs in fishing production. The prediction accuracy of this model is up to 70%-90% or even higher, which is 15% higher than that of the traditional habitat index prediction method or even higher.

DETAILED DESCRIPTION OF THE EMBODIMENTS

Figure 1:
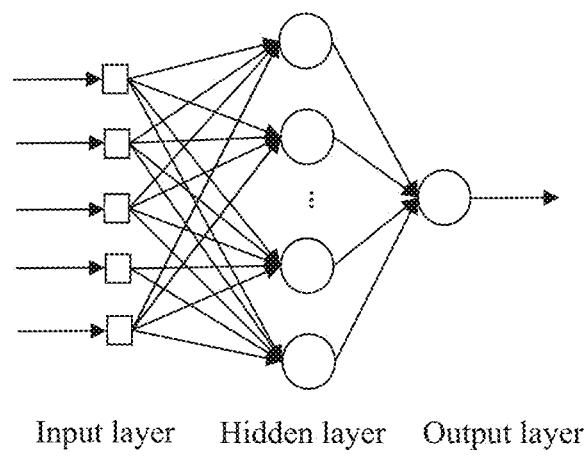
FIG. 1 is a structural diagram of a BP neural network model.
Figure 2:
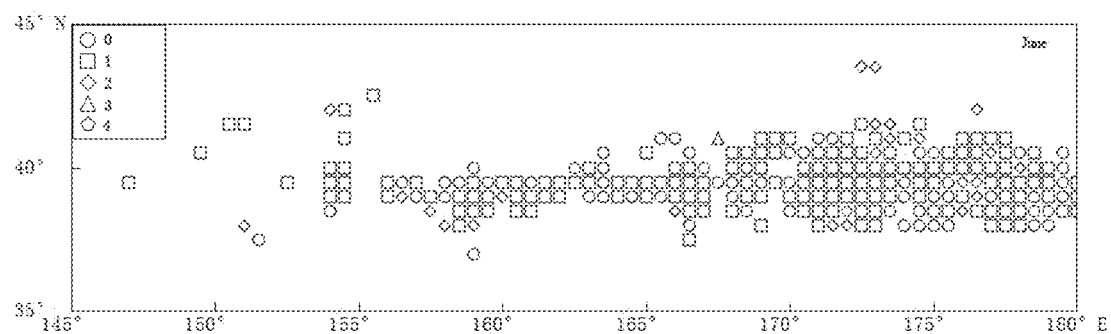
FIG. 2 is a diagram showing an operation distribution of the flying squid (Ommastrephidae) in the northwest Pacific Ocean in June.
Figure 3:
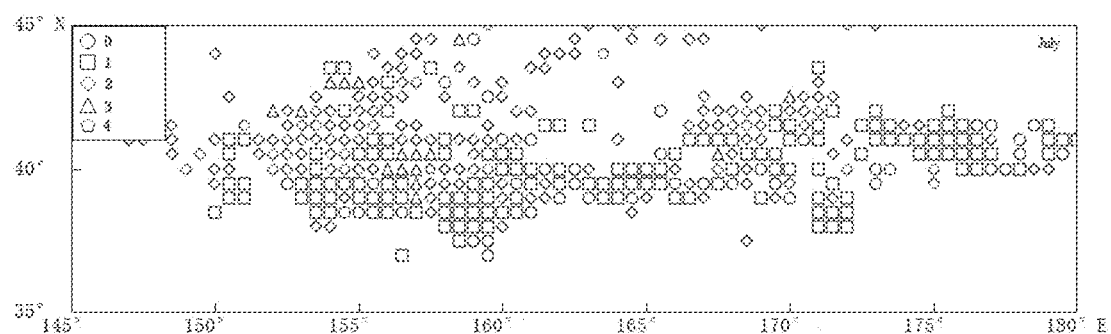
FIG. 3 is a diagram showing an operation distribution of the flying squid (Ommastrephidae) in the northwest Pacific Ocean in July.
Figure 4:
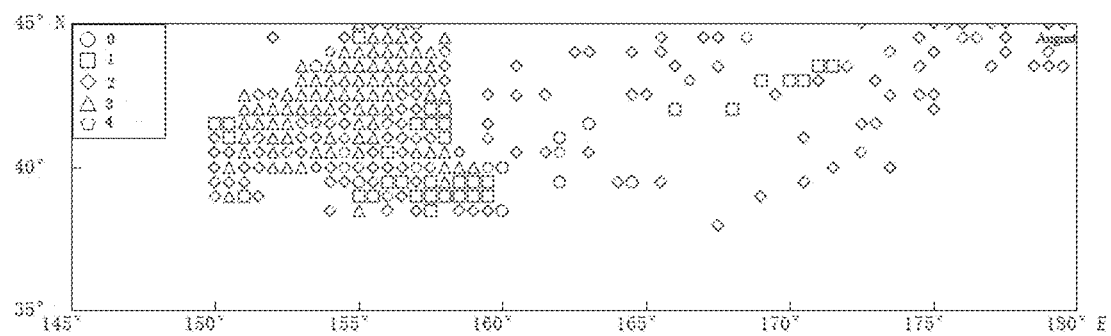
FIG. 4 is a diagram showing an operation distribution of the flying squid (Ommastrephidae) in the northwest Pacific Ocean in August.
Figure 5:
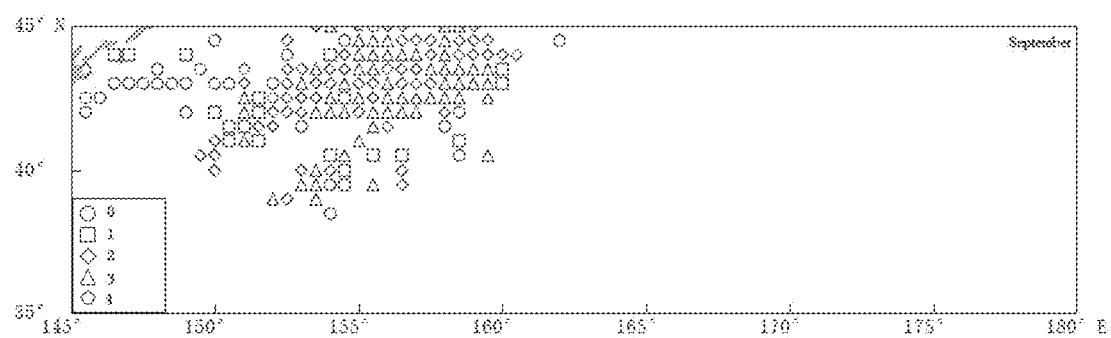
FIG. 5 is a diagram showing an operation distribution of the flying squid (Ommastrephidae) in the northwest Pacific Ocean in September.
Figure 6:
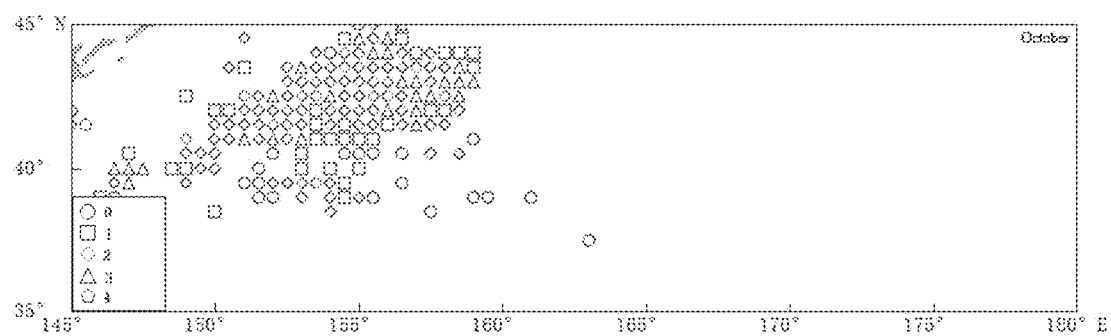
FIG. 6 is a diagram showing an operation distribution of the flying squid (Ommastrephidae) in the northwest Pacific Ocean in October.
Figure 7:
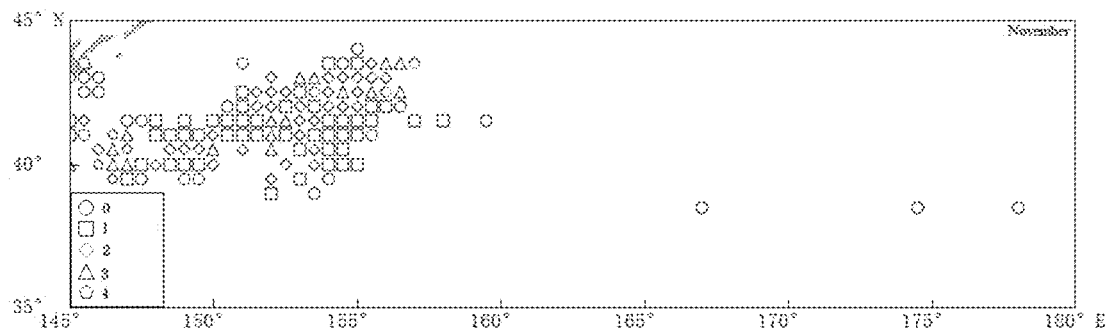
FIG. 7 is a diagram showing an operation distribution of the flying squid (Ommastrephidae) in the northwest Pacific Ocean in November.
Figure 8:
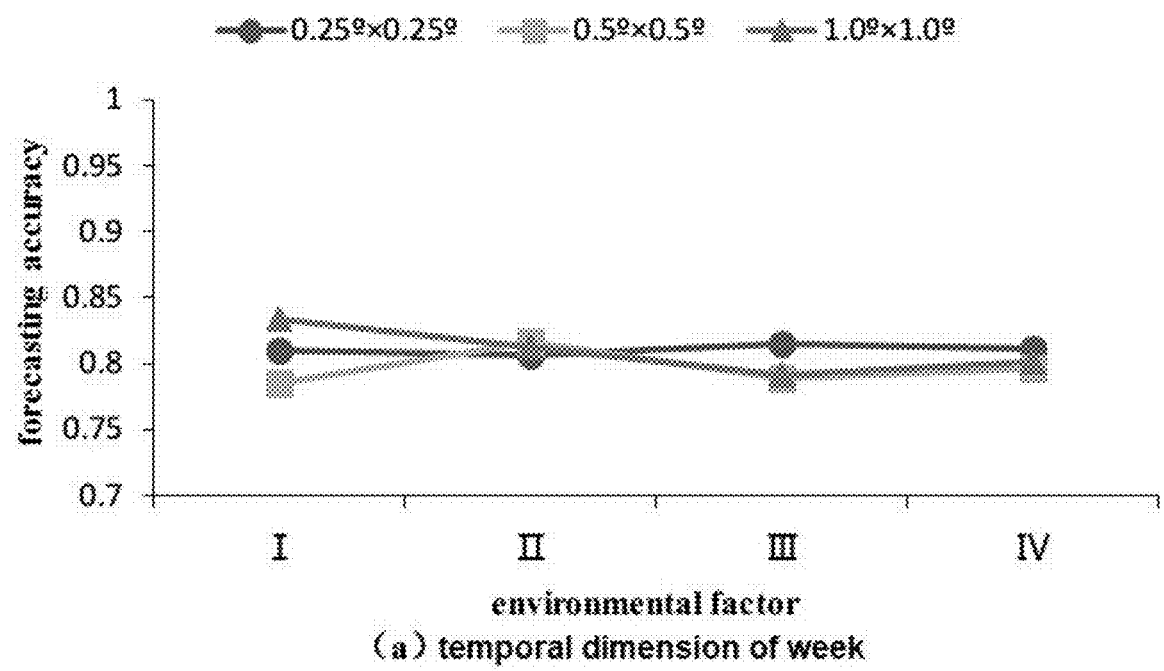
FIG. 8 is a diagram showing forecasting accuracies of a fishing ground of the flying squid (Ommastrephidae) in the northwest Pacific Ocean in 2011 under 24 schemes.
Figure 9:
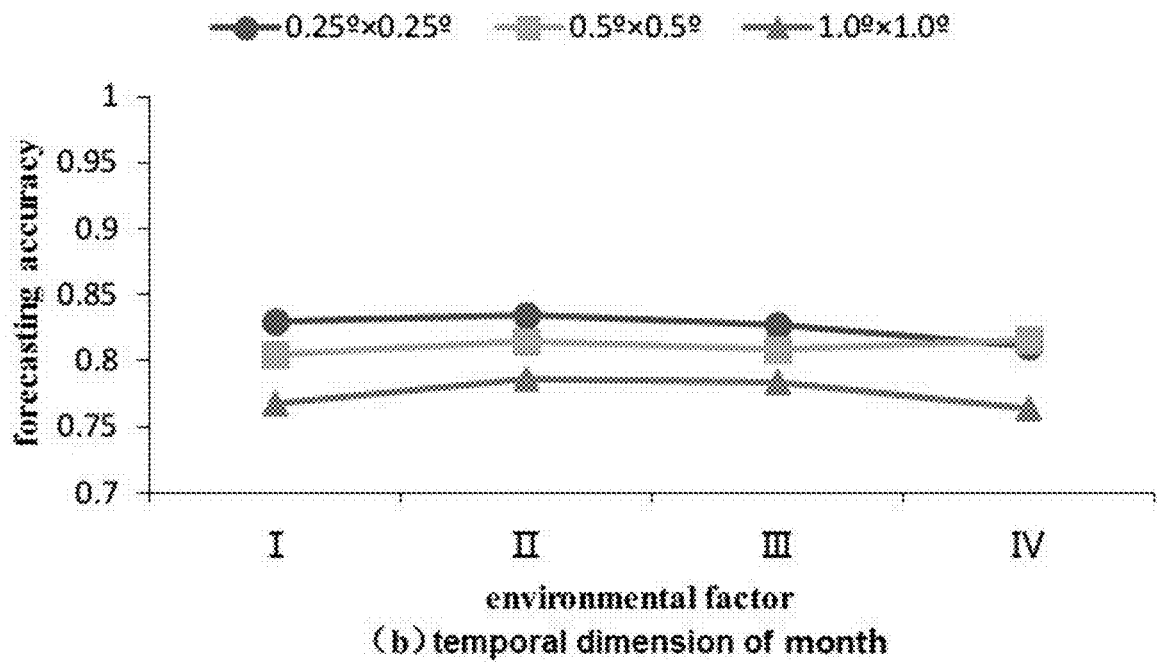
FIG. 9 is a diagram showing forecasting accuracies of a fishing ground of the flying squid (Ommastrephidae) in the northwest Pacific Ocean in 2011 under 24 schemes.
Figure 10:
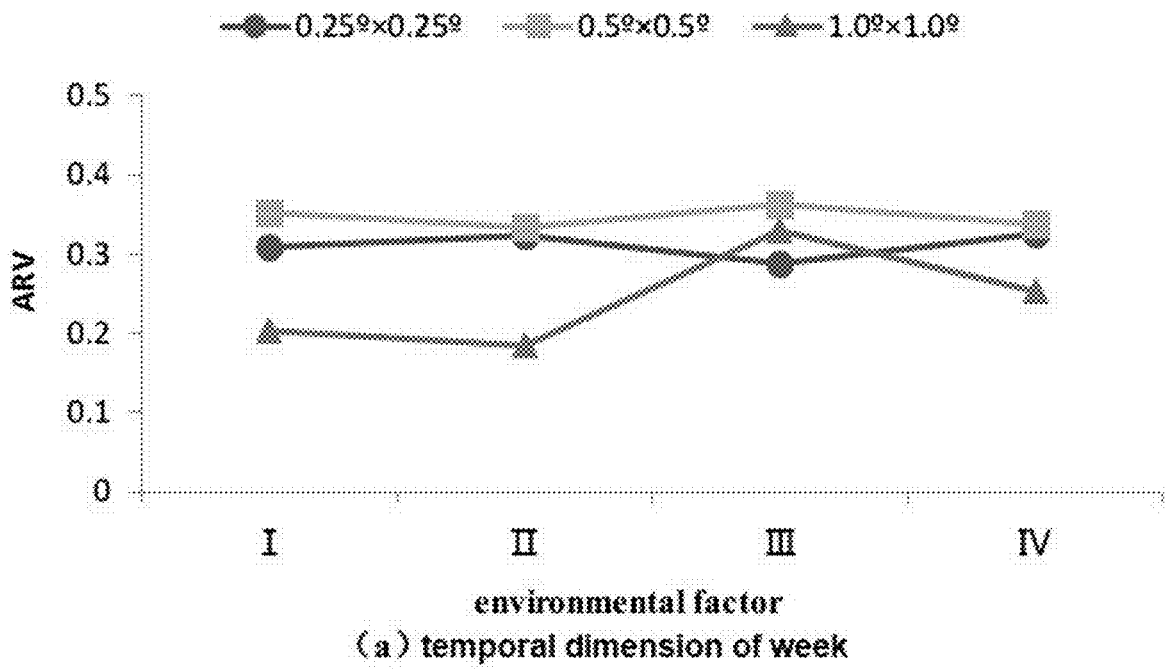
FIG. 10 is a diagram showing ARVs of a fishing ground prediction model of the flying squid (Ommastrephidae) in the northwest Pacific Ocean from 2003 to 2011 under 24 schemes.
Figure 11:
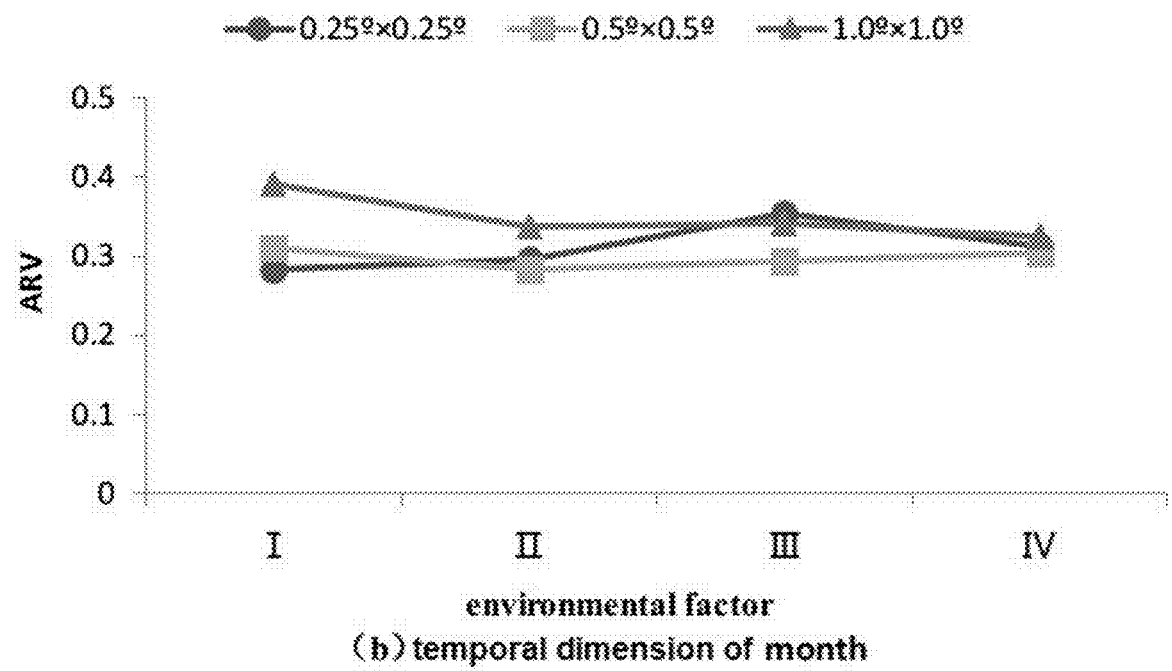
FIG. 11 is a diagram showing ARVs of a fishing ground prediction model of the flying squid (Ommastrephidae) in the northwest Pacific Ocean from 2003 to 2011 under 24 schemes.
Figure 12:
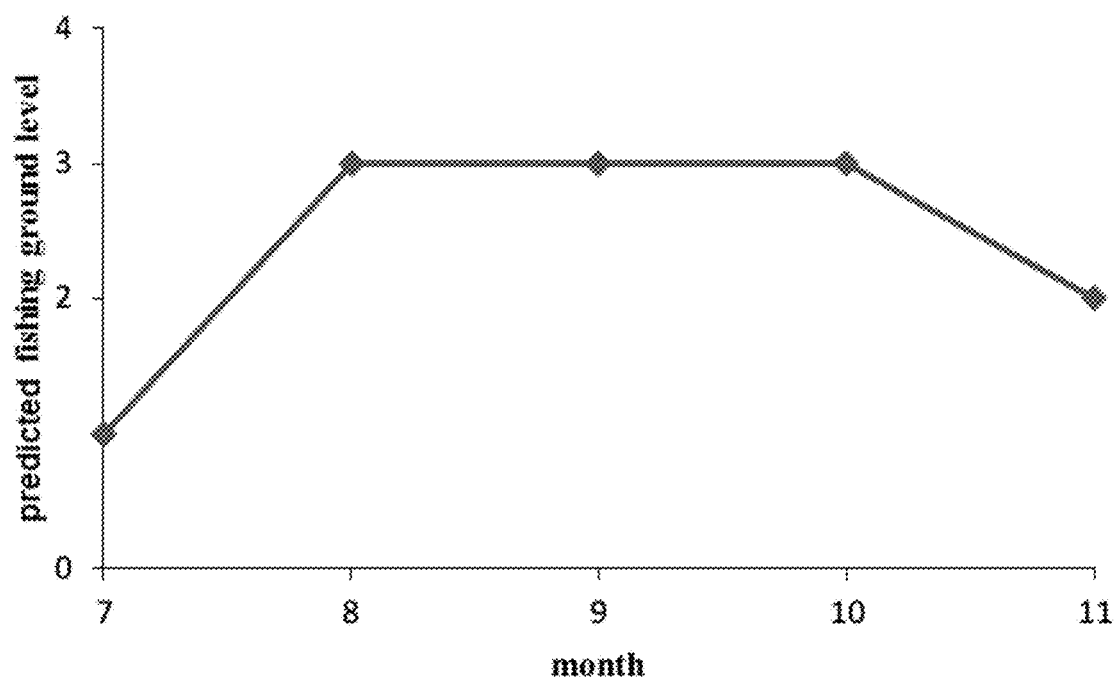
FIG. 12 is a diagram showing a relationship between an input variable of a sensitivity analysis and a predicted fishing ground level under a temporal dimension of month.
Figure 13:
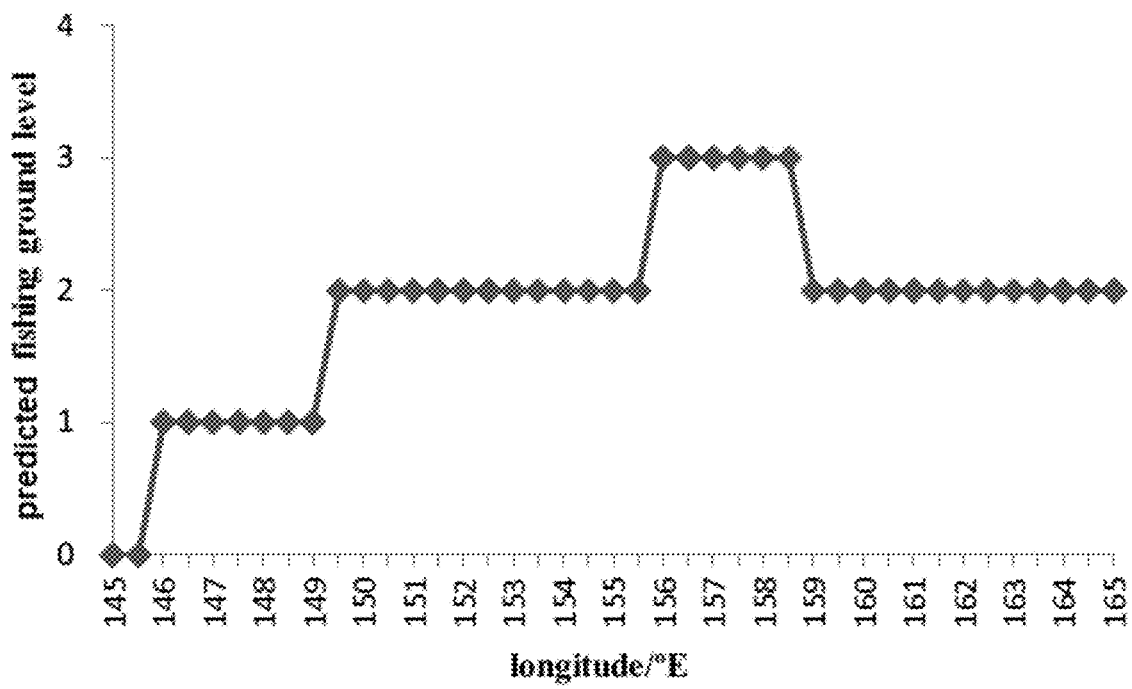
FIG. 13 is a diagram showing a relationship between an input variable of a sensitivity analysis and a predicted fishing ground level under a temporal dimension of month.
Figure 14:
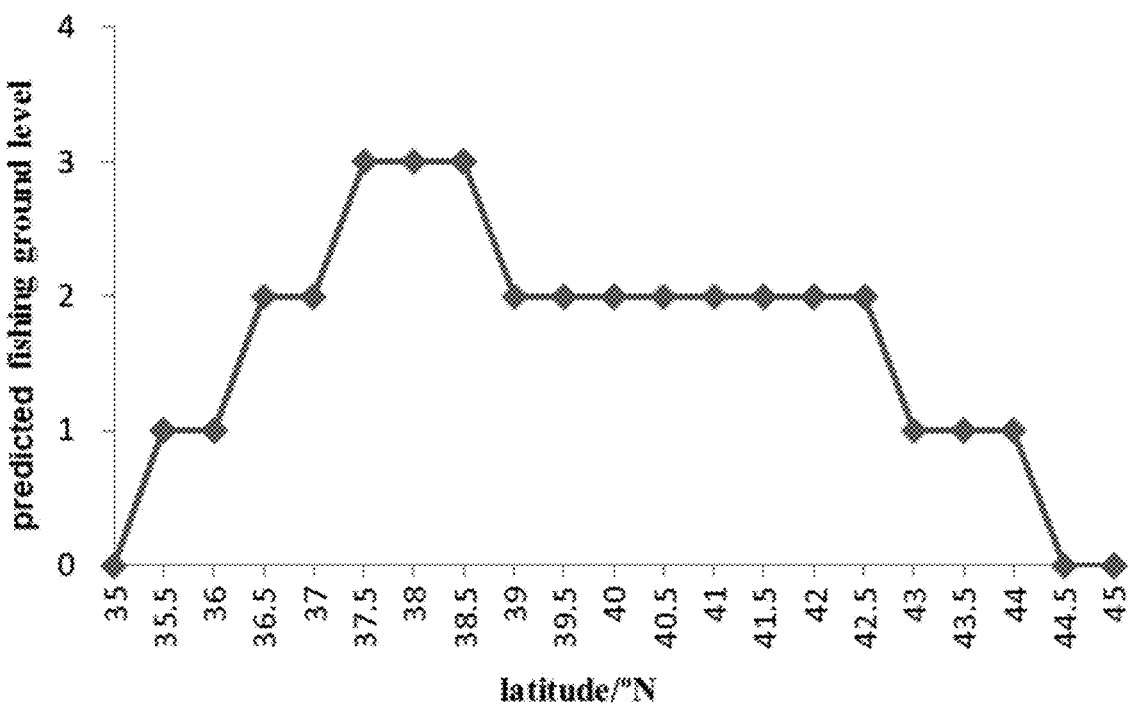
FIG. 14 is a diagram showing a relationship between an input variable of a sensitivity analysis and a predicted fishing ground level under a temporal dimension of month.
Figure 15:
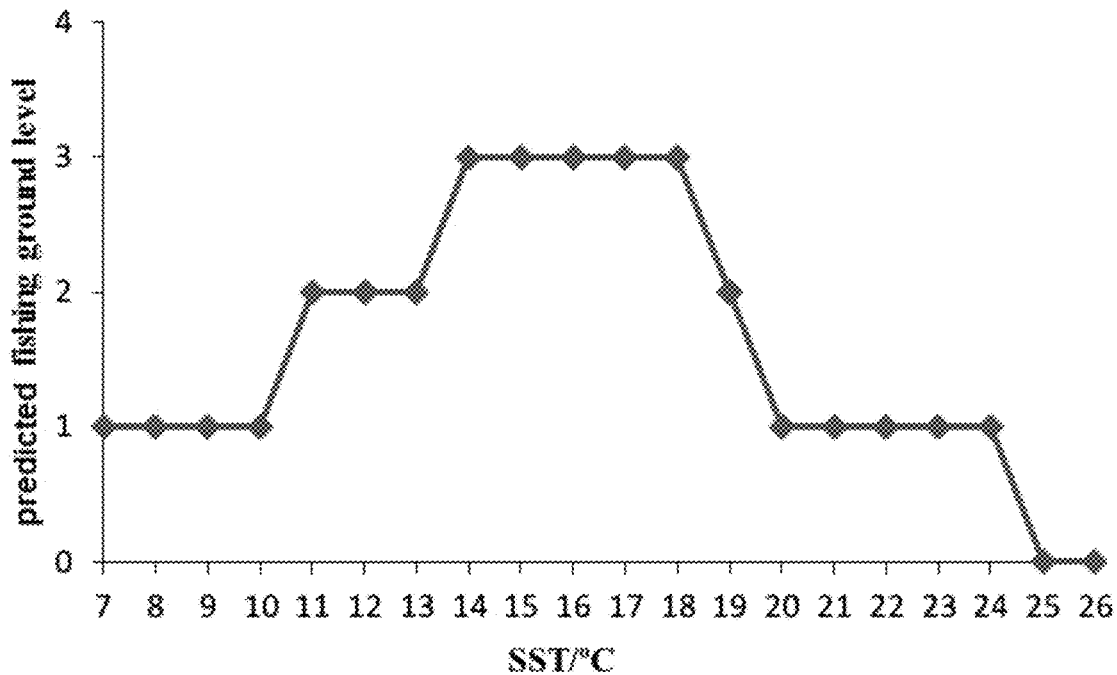
FIG. 15 is a diagram showing a relationship between an input variable of a sensitivity analysis and a predicted fishing ground level under a temporal dimension of month.
Figure 16:
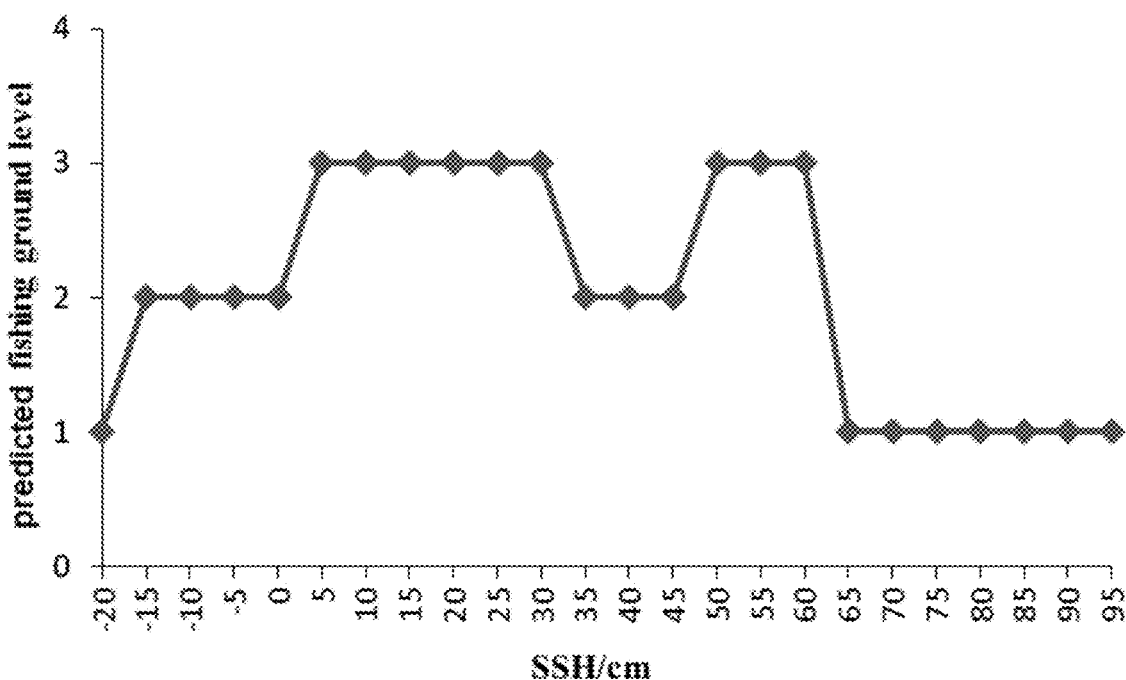
FIG. 16 is a diagram showing a relationship between an input variable of a sensitivity analysis and a predicted fishing ground level under a temporal dimension of month.
Figure 17:
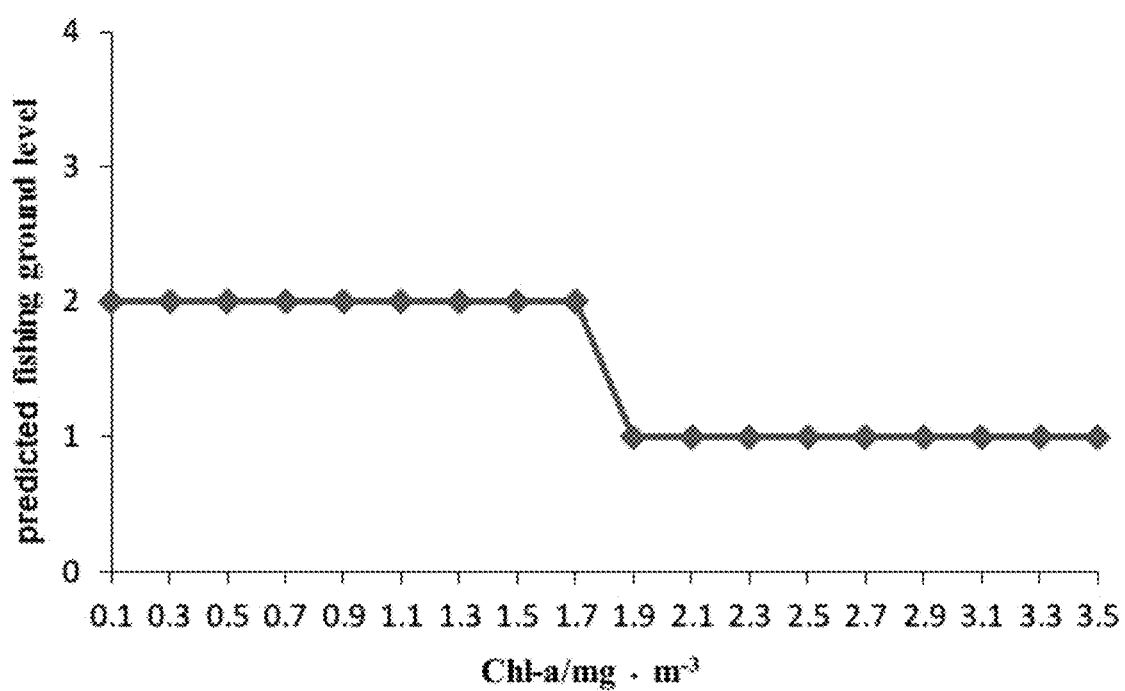
FIG. 17 is a diagram showing a relationship between an input variable of a sensitivity analysis and a predicted fishing ground level under a temporal dimension of month.

The present invention will be further illustrated below with reference to specific embodiments and the drawings.

In different sea areas, the marine environmental conditions are different, and the formation mechanisms of the central fishing grounds are also different. Therefore, the influences of temporal and spatial resolution on the central fishing ground prediction model are also significantly different. In order to understand the influence of the spatial and temporal dimensions of the samples of the oceanic economic flying squid family Ommastrephidae and the selections of environmental factors on the central fishing ground prediction model, a central fishing ground prediction model for business-oriented operation under the optimal spatial and temporal dimensions and environmental factors need to be established.

In order to compare the optimal spatial and temporal dimension of the central fishing ground prediction model of the oceanic economic flying squid family Ommastrephidae, three levels of spatial dimensions are set, i.e., latitude and longitude of 0.25°×0.25°, 0.5°×0.5°, and 1.0°×1.0°, respectively; and two levels of temporal dimensions are set, i.e., week and month.

The resource abundance of fishing ground of the oceanic economic flying squid family Ommastrephidae is affected by not only spatial and temporal factors, but also the environmental factors of the habitat. In this method, the sea surface temperature (SST) is selected as the main environmental factor, and two environmental factors, i.e., sea surface height (SSH) and chlorophyll a (Chl-a), are selected as a supplement. Therefore, when establishing the central fishing ground prediction model, the environmental factors include four situations (Tab. 1).

TABLE 1

Environmental factor settings

| Number | Environmental factor |
|--------|---------------------|
| I | SST |
| II | SST, SSH |
| III | SST, Chl-a |
| IV | SST, SSH, Chl-a |

Therefore, according to the setting situations of the spatial and temporal dimension (three spatial dimensions and two temporal dimensions) of the sample and the four environmental factor setting situations, a set of sample schemes of the central fishing ground prediction models of the oceanic economic flying squid family Ommastrephidae is established and has the following 24 situations.

TABLE 2

Set of sample schemes of BP prediction models

| Scheme number | Temporal dimension | Spatial dimension | Environmental factor |
|---------------|-------------------|-------------------|---------------------|
| 1 | week | 0.25° × 0.25° | I |
| 2 | week | 0.25° × 0.25° | II |
| 3 | week | 0.25° × 0.25° | III |
| 4 | week | 0.25° × 0.25° | IV |
| 5 | week | 0.5° × 0.5° | I |
| 6 | week | 0.5° × 0.5° | II |
| 7 | week | 0.5° × 0.5° | III |
| 8 | week | 0.5° × 0.5° | IV |
| 9 | week | 1.0° × 1.0° | I |
| 10 | week | 1.0° × 1.0° | II |
| 11 | week | 1.0° × 1.0° | III |
| 12 | week | 1.0° × 1.0° | IV |
| 13 | month | 0.25° × 0.25° | I |
| 14 | month | 0.25° × 0.25° | II |
| 15 | month | 0.25° × 0.25° | III |
| 16 | month | 0.25° × 0.25° | IV |
| 17 | month | 0.5° × 0.5° | I |
| 18 | month | 0.5° × 0.5° | II |
| 19 | month | 0.5° × 0.5° | III |
| 20 | month | 0.5° × 0.5° | IV |
| 21 | month | 1.0° × 1.0° | I |
| 22 | month | 1.0° × 1.0° | II |
| 23 | month | 1.0° × 1.0° | III |
| 24 | month | 1.0° × 1.0° | IV |

The central fishing ground prediction model adopts a classic error backward propagation (BP) neural network. The BP neural network belongs to multi-layer forward neural network, and using the supervised algorithm of error backward propagation, the BP neural network is capable of learning and storing a large number of mapping modes.

The BP neural network model has a three-layer structure, including an input layer, a hidden layer and an output layer (as shown in FIG. 1). The input layer inputs the temp-spatial factors of the fishing ground and the marine environmental factors; and the output layer outputs a CPUE or a fishing ground grading index converted from the CPUE. The classification methods of different fishing ground levels refer to the domain knowledge of fishery experts.

The number of nodes in the hidden layer are determined by a formula $P_{num}=2N_{num}+1$, the $P_{num}$ is the number of nodes in the hidden layer, and the $N_{num}$ is the number of nodes in the input layer.

The BP algorithm mainly includes two processes of the forward propagation of the signal of learning process and the backward propagation of the error. During the forward propagation, the sample enters from the input layer, and after processed by the activation function of the hidden layer, the results are propagated to the output layer; if the error between the actual output of the output layer and the desired output of the output layer does not meet the error requirements, the backward propagation stage of the error starts. Backward propagation is to propagate the error layer by layer back to the input layer through the hidden layer, and distribute the error to all nodes in each layer, thereby obtaining the error signals of all nodes in each layer. These error signals are used as the basis for correction. The forward propagation of the signal and the backward propagation of the error are carried out in cycles, and the weight is constantly adjusted, which is the process of network learning. This process is continued until the error of the network output is reduced to an acceptable level or until a preset number of learning times is reached.

The training method is the steepest descent method. Assuming that the number of neurons in the input layer are M, the number of neurons in the hidden layer are I, and the number of neurons in the output layer are J; denoting the $m^{th}$ neuron in the input layer as $X_m$, the $i^{th}$ neuron in the hidden layer as $k_i$, and the $j^{th}$ neuron in the output layer as $Y_j$; denoting the connection weight from $X_m$ to $k_i$ as $W_{mi}$, and the connection weight from $k_i$ to $Y_j$ as $W_{ij}$; the transfer function of the hidden layer is a Sigmoid function, and the transfer function of the output layer is a linear function. u and v represent the input and the output of each layer, respectively. For example, $u_i'$ represents the input of the first neuron in the I layer (hidden layer).

The actual output of the network can be represented as:

$$Y(n)=[v_j^1, v_j^2, \ldots, v_j^J].$$

The desired output of the network is represented as:

$$d(n)=[d_1, d_2, \ldots, d_J];$$

n is the number of iterations. The error signal of the $n^{th}$ iteration is defined as:

$$e_j(n)=d_j(n)-Y_j(n)$$

The error energy is defined as:

$$e(n) = \frac{1}{2}\sum_{j=1}^{J} e_j^2(n).$$

The training process is the process of reducing the error energy.

In the weight adjustment stage, the adjustment is carried out in reverse along the network, layer by layer. First, the weight $w_{ij}$ between the hidden layer and the output layer is adjusted. According to the steepest descent method, the gradient $$\frac{\partial e(n)}{\partial w_{ij}(n)}$$

of the error to $w_{ij}$ should be calculated. Then, the adjustment is carried out along the opposite direction of this direction:

$$\Delta w_{ij}(n) = -\eta \frac{\partial e(n)}{\partial w_{ij}(n)}$$
$$w_{ij}(n+1) = \Delta w_{ij}(n) + w_{ij}(n).$$

The gradient can be obtained by taking the partial derivative. According to the chain rule of differential, there is $$\frac{\partial e(n)}{\partial w_{ij}(n)} = \frac{\partial e(n)}{\partial e_j(n)} \cdot \frac{\partial e_j(n)}{\partial v_J^j(n)} \cdot \frac{\partial v_J^j(n)}{\partial u_J^j(n)} \cdot \frac{\partial u_J^j(n)}{\partial w_{ij}(n)}.$$

Since $e(n)$ is a quadratic function of $e_j(n)$, the differential of $e(n)$ is a linear function:

$$\frac{\partial e(n)}{\partial e_j(n)} = e_j(n)$$
$$\frac{\partial e(n)}{\partial v_J^j(n)} = -1.$$

The derivative of the transfer function of the output layer is:

$$\frac{\partial v_J^j(n)}{\partial u_J^j(n)} = g' u_J^j(n)$$
$$\frac{\partial u_J^j(n)}{\partial w_{ij}(n)} = v_i^j(n);$$

and therefore, the gradient value is:

$$\frac{\partial e(n)}{\partial w_{ij}(n)} = -e_j(n) g'(u_J^j(n)) v_I^j(n).$$

The correction of the weight is:

$$\Delta w_{ij}(n) = \eta e_i(n) g'(u_j^i(n)) v_I^i(n).$$

and the definition of a local gradient is introduced:

$$\delta_j^j = -\frac{\partial e(n)}{\partial u_J^j(n)} = -\frac{\partial e(n)}{\partial e_j(n)} \cdot \frac{\partial e_j(n)}{\partial v_J^j(n)} \cdot \frac{\partial v_J^j(n)}{\partial u_J^j(n)} = e_j(n) g'(u_J^j(n));$$

so, the correction of the weight is:

$$\Delta w_{ij}(n) = \eta \delta_j^j v_I^i(n).$$

In the output layer, the transfer function is a linear function, so the derivative of the transfer function is 1, namely, $$g'(u_j^j(n)) = 1;$$

so, $$\Delta w_{ij}(n) = \eta e_j(n) v_I^i(n)$$

The error signal is propagated forward, and the weight $w_{mi}$ between the input layer and the hidden layer is adjusted, which is similar to the previous step; and there is $$\Delta w_{mi}(n) = \eta \delta_I^j v_M^m(n);$$

$v_M^m(n)$ is the output of the neuron in the input layer, namely, $v_M^m(n) = x^m(n)$.

$\delta_I^i$ is a local gradient, and defined as:

$$\delta_I^i = -\frac{\partial e(n)}{\partial u_I^i(n)} = -\frac{\partial e(n)}{\partial v_I^i(n)} \cdot \frac{\partial v_I^i(n)}{\partial v_I^i(n)} = -\frac{\partial e(n)}{\partial v_I^i(n)} f'(u_I^i(n)).$$

$f(g)$ is the sigmoid function, and at the same time, as calculated in the previous step, $$\frac{\partial e(n)}{\partial v_I^i(n)} = \sum_{j=1}^{J} \delta_J^j w_{ij};$$

so, there is:

$$\delta_I^i = f'(u_I^i(n)) \sum_{j=1}^{J} \delta_J^j w_{ij}.$$

Up to now, the learning weight adjustment process of the three-layer BP network ends, which can be summarized as follows.

The weight adjustment amount $\Delta w$=learning rate $\eta$. local gradient $\delta$. output signal of a previous layer v. As for the settings of the learning rate, the error range, etc., the gradual adjustment and optimization is carried out under a status without overfitting.

The establishment process of BP neural network is completed in Matlab (2010b) software. The sample set is divided into three parts, i.e., training samples, verification samples and test samples, by using the fitting tool of neural network toolbox. The parameters designed for the network are: the learning rate is 0.1, and the momentum parameter is 0.5; the transfer function between the input layer and the hidden layer is S-type tangent function tansig, and the transfer function between the hidden layer and the neuron of the output layer is linear function purelin. The termination parameters of the network training are: the maximum training number is 1000, and the maximum error is given as 0.001. The optimal model is obtained through several times of training, and the weight is used for the forecasting.

The BP prediction model is evaluated from three aspects, i.e., forecast accuracy, stability and interpretability.

(1) Prediction accuracy evaluation. When the outputs of the models are CPUE levels, the accuracies of various models are compared according to the correct level percentages predicted by the models. When the outputs of the models are CPUE values, the mean square error (MSE) of the models is calculated, and the accuracies of the various models are compared.

$$MSE = \frac{1}{N}\sum_{k=1}^{N}(y_k - \hat{y}_k)^2;$$

$y_k$ is the actual value of CPUE, and $\hat{y}_k$ is the predicted value of CPUE.

(2) Stability evaluation. The stabilities of the accuracies of the BP models established by different samples are evaluated, and the average relative variance (ARV) is calculated, which is defined as $$ARV = \frac{\sum_{i=1}^{N}[x(i)-\hat{x}(i)]^2}{\sum_{i=1}^{N}[x(i)-\bar{x}(i)]^2};$$

N is the number of comparison data, $x(i)$ is the actual value of the fishing ground level, $\bar{x}(i)$ is the actual average value of the fishing ground level, and $\hat{x}(i)$ is the predicted value of the fishing ground level. The smaller the average relative variance (ARV), indicating the better the prediction effect. ARV=0 indicates that the ideal prediction effect is achieved; and when ARV=1, it indicates that the model only achieves the average prediction effect.

(3) Interpretability evaluation. For the first time, the interpretability is applied to fishing ground prediction and used as an index to analyze the prediction accuracy of central fishing ground. That is, independent variable relevance and sensitivity analysis are used to evaluate the interpretabilities of the prediction models established on the samples of different spatial and temporal dimensions and environmental factors.

The independent variable relevance is used to compare the contribution rates of various input variables to CPUE. The calculation method includes calculating the ratio of the quadratic sum of the connection weight between each input variable and hidden layer to the quadratic sum of the connection weights between each variable in the input layer and the hidden layer.

The sensitivity analysis includes exploring the relationship between the changes of input variables and output variables, and the process thereof is as follows. Firstly, the particular values of various input variables, i.e., maximum value, minimum value, median value, average value, and mode value, are calculated. Then, one of the input variables is selected to be subjected to a gradual change from the minimum value to the maximum value; and the other input variables are respectively determined as one of the five particular values. The input variables are changed in turn, and the changes of the output variables are observed.

Embodiment 1

For example, the method is applied to the analysis of flying squid (Ommastrephidae) in the northwest Pacific Ocean, and the production data of the fishing of flying squid (Ommastrephidae) in the northwest Pacific Ocean from 2003 to 2011 is processed into a sample with a temporal resolution of "month" and a spatial resolution of 0.5°×0.5°. The Nominal CPUE in a small fishing zone is calculated; and the Nominal CPUE is classified into different fishing ground levels based on knowledge of fishery experts (Tab. 3).

TABLE 3

CPUE-based fishing ground levels of flying squid (Ommastrephidae) in the northwest Pacific Ocean

| Code | Catch per unit effort interval (CPUE: t/d) | Fishing ground level |
|---|---|---|
| 0 | <0.5 | worse |
| 1 | 0.5-1.5 | poor |
| 2 | 1.5-3 | general |
| 3 | 3-6 | good |
| 4 | >6 | excellent |

The operation distribution diagrams based on the fishing ground levels (FIGS. 2-7) are drawn using geographic information system. In June and July, the fishing grounds are widely distributed and the longitude span is large, ranging from 150° E to 180° E. In August, September, October, and November, the fishing grounds are mainly concentrated in the west (west of 165° E), and the longitude span is relatively small. From June to November, the fishing grounds have a tendency to gradually move westward.

The original samples are preprocessed into a set including 24 samples according to the setting methods of spatial and temporal dimension and environmental factor of samples using FDP software. Data from 2003 to 2010 is used as training and verification samples; and data of 2011 is used as test sample. Using Matlab neural network tool, the central fishing ground prediction models of flying squid (Ommastrephidae) in the northwest Pacific Ocean, in different spatial and temporal dimensions and environmental factors, are established according to the modeling method; and the accuracies of the models and the ARV values of the entire samples from 2003 to 2011 are calculated (as shown in FIGS. 8-11).

For example, the above-mentioned sample scheme 9 is adopted, the sample scheme 9 has a temporal dimension of week, a spatial dimension of 1.0° 1.0°, and an environmental factor of SST. The established model has a prediction accuracy of about 85% and an ARV value of about 0.2, and the established model has the highest accuracy and the smallest ARV value. The sample scheme 18 has a temporal dimension of month, a spatial dimension of 0.5°×0.5°, and environmental factors of SST and SSH; the established fishing ground prediction model also has a prediction accuracy of more than 80% and an ARV value of about 0.3, and the established fishing ground prediction model has relatively high accuracy and relatively small ARV value. Comparing the two sample schemes, the scheme 9 is better (FIGS. 8-11).

In order to explore the selection effects of various environmental factors on fishing grounds, the model established by sample scheme 20 is selected for variable relevance analysis and sensitivity analysis. Tab. 4 shows the contribution rates of various variables with time, longitude, latitude, SST, SSH, and Chl-a as input variables. FIGS. 12-17 show the changes of the model prediction (represented by level) according to the sensitivity analysis.

TABLE 4

Variable relevance analysis of prediction model

| Variable factor | Contribution rate |
|---|---|
| Month | 21.78% |
| Longitude | 11.91% |
| Latitude | 23.91% |
| SST | 26.04% |
| SSH | 5.54% |
| Chl-a concentration | 10.79% |

The variable relevance analysis shows that SST has the largest contribution rate to the fishing ground prediction model of flying squid (Ommastrephidae) in the northwest Pacific Ocean, which is 26.04%, followed by the Variable factor "Month"; and environmental factor SSH has the lowest contribution rate, which is only 5.54%.

Sensitivity analysis shows that the spatial and temporal changes of the fishing ground of flying squid (Ommastrephidae) in the northwest Pacific Ocean are complex. The main (high-yield) operation time is August, September, and October, and the fishing ground level is relatively high and the resources are relatively abundant. The optimal operating sea area is 150° E-165°E, 37°N-42°N. and the range of SST suitable for inhabitation of flying squid (Omnmastrephidae) is 11° C.-18° C., the range of SSH is from −10 cm to 60 cm, and the range of Chl-a range is 0.1-1.7 mg/m$^3$.

Embodiment 2

The method is applied to the analysis of Humboldt squid (*Dosidicus gigas*) in the southeast Pacific Ocean, and the production data of the fishing of Humboldt squid (*Dosidicus gigas*) in the southeast Pacific Ocean is processed into a sample with a temporal resolution of "month" and a spatial resolution of 0.5°×0.5°. The Nominal CPUE in a small fishing zone is calculated; the Nominal CPUE is classified into different fishing ground levels based on knowledge of fishery experts (Tab. 5); and the operation distribution diagram based on the fishing ground levels is drawn in the MarineStar software.

TABLE 5

CPUE-based fishing ground levels of Humboldt squid (*Dosidicus gigas*) in the southeast Pacific Ocean

| Code | CPUE (t/d) | Fishing ground level |
|---|---|---|
| 0 | 0-1 | worse |
| 1 | 1-3 | poor |
| 2 | 3-5 | general |
| 3 | 5-10 | good |
| 4 | >10 | excellent |

Similarly, the original samples are preprocessed into a set including 24 samples according to setting methods of the spatial and temporal dimension and environmental factor of samples using FDP software. Using Matlab neural network tool, the central fishing ground models of Humboldt squid (*Dosidicus gigas*) in the southeast Pacific Ocean, in different spatial and temporal dimensions and environmental factors, are established according to the BP neural network modeling method; and the accuracies of the models and the ARV values of the entire samples are calculated.

The sample schemes 6 and 7 have a temporal dimension of week, a spatial dimension of 0.5°×0.5°, and environmental factors of II and III, respectively; the established fishing ground prediction models have a prediction accuracy of about 70% and an ARV value of about 0.3, and the established fishing ground prediction models have relatively high accuracy and relatively small ARV value. The sample schemes 18 and 19 have a temporal dimension of month, a spatial dimension of 0.5°×0.5°, and environmental factors of II and III, respectively; the established fishing ground prediction models also have a prediction accuracy of above 70% and an ARV value of about 0.2, and the established fishing ground prediction models have the highest accuracy and relatively small ARV value. However, according to the real-time analysis of remote sensing data, the data of sea surface height is easier to be obtained than that of chlorophyll a concentration, and therefore the scheme 18 is better. Therefore, the model established by the sample scheme 18, namely the sample with the temporal dimension of month, the spatial dimension of 0.50×0.50 and the environmental factor of II, is selected as the final prediction model.

According to the calculation results of variable relevance (Tab. 6), the analysis shows that the input variable, i.e., SSTA in the Niño-3.4 region, has the largest contribution rate to the output CPUE, reaching 28.95%, followed by the variable SST and Latitude, the contribution rates thereof are 22.1% and 19.68%, respectively; and the variable of Month has the lowest contribution rate, which is only 9.87%.

TABLE 6

Variable relevance analysis of prediction model

| Variable | Contribution rate |
|---|---|
| Month | 9.87% |
| Longitude | 10.94% |
| Latitude | 19.68% |
| SST | 22.10% |
| SSH | 8.46% |
| SSTA in the Niño-3.4 region | 28.95% |

Embodiment 3

The method is applied to the analysis of Argentine shortfin squid (*Illex argentinus*). The Nominal CPUE is classified into different fishing ground levels based on knowledge of fishery experts, as shown in Tab. 7; and the operation distribution diagram based on the fishing ground levels is drawn in the MarineStar software.

TABLE 7

CPUE-based fishing ground levels of Argentine shortfin squid (*Illex argentinus*)

| Code | CPUE (t/d) | Fishing ground level |
|---|---|---|
| 0 | =0 | worse |
| 1 | 0-10 | poor |
| 2 | 10-20 | general |
| 3 | 20-30 | good |
| 4 | >30 | excellent |

A central fishing ground prediction model of the Argentine shortfin squid (*Illex argentinus*), in different spatial and temporal dimensions and environmental factors, is established using this prediction method, which can achieve a prediction accuracy of more than 90% and an ARV value of about 0.2, the established central fishing ground prediction model has the highest accuracy and the smallest ARV value. The sample scheme 9 has a temporal dimension of week, a spatial dimension of 1.0°×1.0°, and an environmental factor of SST; and the established fishing ground prediction model has a prediction accuracy of above 90% and an ARV value of about 0.2, with the highest accuracy and smallest ARV value. The sample scheme 13 has a temporal dimension of month, a spatial dimension of 0.25°×0.25°, and an environmental factor of SST; and the established fishing ground prediction model also has a prediction accuracy of above 90% and an ARV value of about 0.2. However, from the prediction accuracy analysis, the sample scheme 9 is better.

The variable relevance analysis shows that under the temporal dimensions of week and month, SST has the largest contribution rate to the fishing ground prediction model of the Argentine shortfin squid (*Illex argentinus*), followed by the "latitude" variable (Tab. 8).

TABLE 8

Variable relevance analysis of prediction model

| Variable | Temporal dimension of week (Contribution rate) | Temporal dimension of month (Contribution rate) |
| --- | --- | --- |
| Month | 11.25% | 15.78% |
| Longitude | 16.31% | 11.91% |
| Latitude | 30.23% | 32.91% |
| SST | 42.21% | 39.4% |

In the present invention, considering the influence of different spatial and temporal dimensions and the selections of environmental factors on the central fishing ground prediction model, a classic error backward propagation (BP) neural network is used. The BP neural network belongs to multi-layer forward neural network, and using the supervised algorithm of error backward propagation, the BP neural network is capable of learning and storing a large number of mapping modes. Moreover, the BP neural network is used for the forecasting in the main (high-yield) operating time, in the optimal operating sea range, and in the SST range, the SSH range and the Chl-a range suitable for the inhabitation of flying squid family Ommastrephidae, which provides technical support for improving catch yields and reduce fuel costs in fishing production. The prediction accuracy of this model established by this prediction method is up to 70%-90% or even higher, which is 15% higher than that of the traditional habitat index prediction method or even higher.

What is claimed is:

1. A method of predicting a central fishing ground of flying squid family Ommastrephidae, comprising: setting a spatial and temporal dimension, setting environmental factors, and establishing a central fishing ground prediction model; wherein the spatial and temporal dimension comprises three levels of spatial dimensions and two levels of temporal dimensions, the three levels of spatial dimensions are latitude and longitude of 0.25°×0.25°, 0.5°×0.5°, and 1.0°×1.0°, respectively, and the two levels of temporal dimensions are week and month;

an SST (sea surface temperature) is selected as a main environmental factor, two environmental factors including SSH (sea surface height) and Chl-a (chlorophyll a) are selected as a supplement; when establishing the central fishing ground prediction model, the environmental factors comprise four setting situations: I. SST; II. SST, SSH; III. SST, Chl-a; and IV. SST, SSH, Chl-a; according to the setting situations of the spatial and temporal dimension and the environmental factor, a set of sample schemes comprising 24 situations is established using a permutation and combination method; and the central fishing ground prediction model is a classic error backward propagation (BP) neural network model, and the BP neural network model has a three-layer structure, comprising an input layer, a hidden layer and an output layer; and wherein the input layer inputs temp-spatial factors and the environmental factors of a fishing ground; and the output layer outputs a CPUE (catch per unit effort) or a fishing ground grading index converted from the CPUE; when the BP neural network model is subjected to a forward propagation, a sample enters from the input layer, and after processed by an activation function of the hidden layer, results are propagated to the output layer; if an error between an actual output of the output layer and a desired output of the output layer does not meet requirements of an error, a backward propagation stage of the error starts; a back propagation is to propagate the error layer by layer back to the input layer through the hidden layer, and distribute the error to all nodes in each layer, thereby obtaining an error signals of all nodes in each layer; and the error signals are used as a basis for correction; and a forward propagation of the error signal and the backward propagation of the error are carried out in cycles, and a weight is constantly adjusted, the error of an output of the neural network model is reduced to an acceptable level or until a preset number of learning times is reached; and then an optimal model is obtained through learning and training for use in forecasting.

2. The method of predicting the central fishing ground of flying squid family Ommastrephidae according to claim 1, wherein a number of nodes in the hidden layer is determined by a formula $P_{num}=2N_{num}+1$; wherein the $P_{num}$ is the number of nodes in the hidden layer, and the $N_{num}$ is a number of nodes in the input layer.

3. The method of predicting the central fishing ground of flying squid family Ommastrephidae according to claim 1, wherein after the establishment of the BP neural network model; accuracies and stabilities of BP neural network models obtained from a set of sample schemes of different situations are compared; and a model with highest accuracy and stability under a predetermined environment is obtained, and is used as the central fishing ground prediction model in the predetermined environment.

4. The method of predicting the central fishing ground of flying squid family Ommastrephidae according to claim 3, wherein when the outputs of the BP neural network models are CPUE levels, the accuracies of the BP neural network models obtained from the set of sample schemes of different situations are compared according to correct level percentages predicted by the BP neural network models; and when the outputs of the BP neural network models are CPUE values, mean square errors of the BP neural network models are calculated, and the accuracies of the BP neural network models obtained from the set of sample schemes of different situations are compared.

5. The method of predicting the central fishing ground of flying squid family Ommastrephidae according to claim 3, wherein the stabilities of the BP neural network models obtained from the set of sample schemes of different situations are compared by calculating an average relative variance (ARV); wherein the average relative variance is defined as follows:

$$ARV = \frac{\sum_{i=1}^{N}[x(i)-\hat{x}(i)]^2}{\sum_{i=1}^{N}[x(i)-\bar{x}(i)]^2};$$

and wherein, N is a number of comparison data, $x(i)$ is an actual value of a fishing ground level, $\bar{x}(i)$ is an actual average of the fishing ground level, and $\hat{x}(i)$ is a predicted value of the fishing ground level.

6. The method of predicting the central fishing ground of flying squid family Ommastrephidae according to claim 3, wherein after the comparison, for prediction of a central fishing ground of the flying squid (Ommastrephidae) in the northwest Pacific Ocean, the BP neural network model of a sample scheme with a temporal dimension of week, a spatial dimension of 1.0°×1.0°, and an environmental factor of SST is used as the central fishing ground prediction model.

7. The method of predicting the central fishing ground of flying squid family Ommastrephidae according to claim 3, wherein for prediction of a central fishing ground of the Humboldt squid (*Dosidicus gigas*) in the southeast Pacific Ocean, the BP neural network model of a sample scheme with a temporal dimension of month, a spatial dimension of 0.5°×0.5°, and environmental factors of SST and SSH is used as the central fishing ground prediction model.

8. The method of predicting the central fishing ground of flying squid family Ommastrephidae according to claim 3, wherein for prediction of a central fishing ground of the Argentine shortfin squid (*Illex argentinus*), the BP neural network model of a sample scheme with a temporal dimension of week, a spatial dimension of 1.0°×1.0°, and an environmental factor of SST is used as the central fishing ground prediction model.

* * * * *